United States Patent
Chen

(10) Patent No.: US 9,221,392 B2
(45) Date of Patent: Dec. 29, 2015

(54) WARNING DEVICE AND METHOD FOR VEHICLES

(71) Applicant: Au-lite Lighting Inc., Hsinchu (TW)

(72) Inventor: Chang-Hung Chen, Hsinchu (TW)

(73) Assignee: AU-LITE LIGHTING INC., Hsinchu (TW)

( * ) Notice: Subject to any disclaimer, the term of this patent is extended or adjusted under 35 U.S.C. 154(b) by 83 days.

(21) Appl. No.: 14/143,179

(22) Filed: Dec. 30, 2013

(65) Prior Publication Data

US 2014/0300464 A1 Oct. 9, 2014

(30) Foreign Application Priority Data

Apr. 9, 2013 (TW) ............................... 102112574 A

(51) Int. Cl.
  *B60Q 1/52* (2006.01)
  *B60Q 1/46* (2006.01)
  *B60Q 1/24* (2006.01)
  *B60Q 1/32* (2006.01)
(52) U.S. Cl.
  CPC .. *B60Q 1/46* (2013.01); *B60Q 1/24* (2013.01); *B60Q 1/32* (2013.01); *B60Q 2400/50* (2013.01)

(58) Field of Classification Search
  CPC ............. G02B 1/00; F21S 48/10; B60Q 1/32; F21Y 2103/00
  USPC .................. 340/471, 468, 436, 438; 362/459; 359/533
  See application file for complete search history.

(56) References Cited

U.S. PATENT DOCUMENTS

| | | | |
|---|---|---|---|
| 2004/0189449 A1* | 9/2004 | Lopez | 340/426.22 |
| 2004/0217855 A1* | 11/2004 | Wang | 340/468 |
| 2007/0081350 A1* | 4/2007 | Huang | 362/494 |
| 2007/0195540 A1* | 8/2007 | Misawa et al. | 362/459 |
| 2010/0290774 A1* | 11/2010 | Matsuoka et al. | 396/155 |

\* cited by examiner

*Primary Examiner* — Phung Nguyen
(74) *Attorney, Agent, or Firm* — The PL Law Group, PLLC

(57) ABSTRACT

A warning device for a vehicle is provided. The warning device comprises a main body including a lateral side and a bottom side, a first light device configured on the main body and emitting a first light toward the lateral side, and at least one of a second light device and a laser module configured on the main body and emitting a second light toward the bottom side.

15 Claims, 5 Drawing Sheets

WARNING DEVICE AND METHOD FOR VEHICLES

CROSS REFERENCE TO RELATED APPLICATIONS

The present invention claims the benefits of priority from Taiwanese Patent Application No. 102112574, filed on Apr. 9, 2013, the disclosures of which are incorporated herein in their entirety by reference.

FIELD OF THE INVENTION

The present application relates to a warning device and a warning method for vehicles, particularly to a device and method that combine warning and illumination.

BACKGROUND OF THE INVENTION

Generally, in addition to the front and rear directional indicators, it is stipulated that large vehicles should be equipped with side lights, which are also called side markers, on both sides. These side-facing lights make the vehicle's presence, position and direction of travel clearly visible from oblique angles. When the front and rear directional indicators are switched on for an intended turn or lane change, the side lights brighten or flash at the same time to make the turn indication visible laterally rather than just to the front and rear of the vehicle and thus reduce the occurrence of traffic collisions. When the directional indicators are not switched on, the side lights may be configured to function as position lamps.

The issue of enhancing the traffic safety is always a hot topic. Recent studies have show that the combinations of the side LED lamps with turning LED indicators in various display patterns achieve better warning effects, particularly at night. However, the side lights in the above scheme can achieve no unexpected function apart from its original function of warning and turning indication. Because it is stipulated in most countries that large vehicle should be equipped with side lights, users have a strong preference for multifunction side lights.

Therefore, because of the shortcomings of the prior art, the inventors provide a warning device and method for vehicles to effectively overcome the limitations of the prior art.

SUMMARY OF THE INVENTION

In accordance with one aspect of the present disclosure, a warning device for a vehicle is provided. The warning device comprises a main body including a lateral side and a bottom side, a warning light device configured on the main body and emitting a warning light toward the lateral side, and at least one of an auxiliary illumination light device and a laser module configured on the main body and emitting an auxiliary light toward the bottom side.

In accordance with another aspect of the present disclosure, a warning device for a first vehicle is provided. The warning device comprises a main body including a lateral side and a bottom side, a first light device configured on the main body and emitting a first light toward the lateral side, and at least one of a second light device and a laser module configured on the main body and emitting a second light toward the bottom side.

In accordance with another aspect of the present disclosure, a warning method for a first vehicle is provided. The warning method comprises steps of providing a main body including a lateral side and a bottom side, emitting a first light from the main body toward the lateral side and emitting a second light from the main body toward the bottom side.

The above objects and advantages of the present disclosure will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The term "user" used hereafter refers to someone using the warning device for vehicles according to the present disclosure. The phrase "user vehicle" used hereafter refers to a vehicle equipped with a warning device according to the present disclosure.

Figure 1:
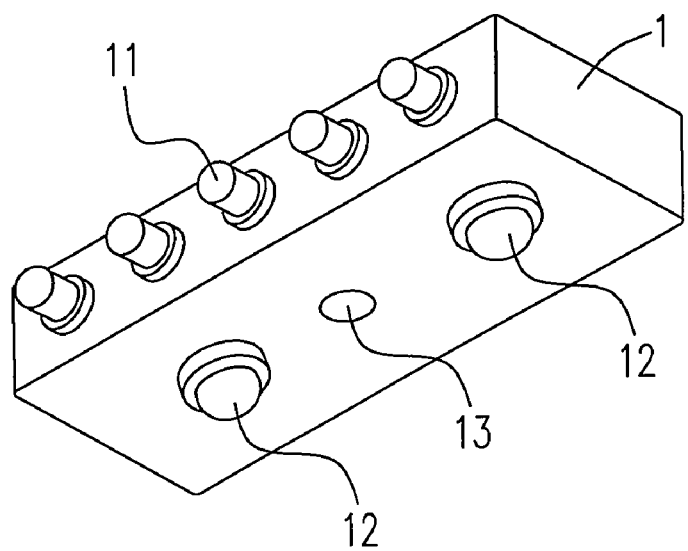
FIG. 1 is a diagram showing a warning device for vehicles according to a first embodiment of the present invention.

Please refer to FIG. 1, which shows a warning device for vehicles according to a first embodiment of the present invention, which includes a device body 1, a warning light 11, an auxiliary illumination light 12 and a laser module 13. The warning light 11, the auxiliary illumination light 12 and the laser module 13 are configured on the device body 1. The warning light 11 emits a warning signal toward the lateral side of the device body 1, where the warning signal may be a warning light signal. The warning light 11 makes a vehicle conspicuous and visible with respect to its presence, position or change in direction. The auxiliary illumination light 12 and the laser module 13 emit auxiliary lights toward the bottom side of the device body 1. The auxiliary lights include an auxiliary illumination light emitted from the auxiliary illumination light 12 and a laser light emitted from the laser module 13. In this embodiment, the device body 1 has both the auxiliary illumination light 12 and the laser module 13. However, the device body 1 may have only one of the auxiliary illumination light 12 and the laser module 13 depending on the user preference or the actual requirement. The position of the warning light 11 on the device body 1 is not limited as long as it can emit the warning light toward the lateral side of the device body 1. For example, the warning light 11 may be directly configured on an outer side surface of the device body 1, as shown in FIG. 1. Alternatively, the warning light 11 may be configured inside the device body 1, and emits the warning light toward the lateral side through the device body 1 when it is made of transparent material or has a hollow frame. Specifically, when the warning device is mounted on a car, preferably the warning light 11 emits the warning signal in a direction substantially parallel to the pavement. Similarly, the positions of the auxiliary illumination light 12 and the laser module 13 on the device body 1 are not limited as long as they can emit auxiliary lights toward the bottom side of the device body 1. Specifically, when the warning device is mounted on a car, preferably the auxiliary illumination light 12 and the laser module 13 emit auxiliary lights in a direction substantially toward the pavement. The warning light and the auxiliary light may brighten or flash independently.

Generally, the warning signal from the warning light 11 functions as a visual alert. When the warning device for vehicles of the first embodiment is mounted on both sides or the rear of a large vehicle such as an engineering vehicle, the device can warn other drivers or pedestrians to notice the movement of the large vehicle. The warning light 11 can also function as a position lamp, particularly at night, to locate sides or rims of the user vehicle. Preferably, the warning signal shines red or amber light, but it is not limited thereto.

The auxiliary light provided by the auxiliary illumination light 12 is the auxiliary illumination light, which functions for illumination in general. However, the activation of the auxiliary illumination light 12 also has the warning effect. When a driver has a flat tire or the vehicle is otherwise immobilized, the auxiliary illumination light 12 can serve as an illumination light for emergency work. In addition, the auxiliary illumination light 12 can provide auxiliary illumination for loading or unloading cargo. The configuration of the warning device for vehicles may depend on the intended function of the auxiliary illumination light 12. For example, the warning device may be configured above the wheels or at the tail of a vehicle. To achieve the purpose of clear illumination, the auxiliary illumination light 12 preferably shines white or yellow light, but it is not limited thereto. In addition, preferably the auxiliary illumination light 12 has an adjustable lighting angle, and thus based on the user preference or the mounted position of the warning device for vehicles, various illumination angles can be provided by the auxiliary illumination light 12. The warning light 11 and auxiliary illumination light 12 are preferably LED lights.

The laser module 13 emits light toward the bottom of the device body to provide an auxiliary light on the ground, wherein the auxiliary light is a laser light, such as a laser dotted linear light or a laser linear light. The laser linear light on the ground can outline the occupied range of the user vehicle or the safety distance so as to warn other drivers or pedestrians against approaching or entering the region outlined by the laser linear light. For large vehicles, there are many blind spots and large "push" and "pull" air flows when it moves. Particularly, the air flows will affect the stability and balance of any moving motorcycles nearby. Therefore, preferably, the laser linear light indicates the wind-shear ranges of the user vehicle to prevent the danger that may occur due to the near approach of motorcycles. In addition, the laser linear light on the ground beside the user vehicle can serve as a warning line to warn the user. For instance, when the user vehicles driving on a narrow road or a road having a gutter or hole, the change of the warning line (e.g. becoming a nonlinear line, disappearance, and so on) can warn the user of the pavement conditions. For large vehicles such as trucks or container cars, the laser linear light may serve as a reference line or warning line especially when the vehicle intends to change the running direction. In addition, preferably, the laser module 13 has an adjustable lighting angle, and thus the distance between the laser linear light on the ground and the user vehicle is adjustable depending on the user preference and the mounted position of the warning device. Based on the demand, the laser linear light may emit red light (650-660 nm), green light (532 nm) or blue light (445-450 nm), and the length thereof may be designed to comply with the vehicle to be mounted with the device.

Figure 2:
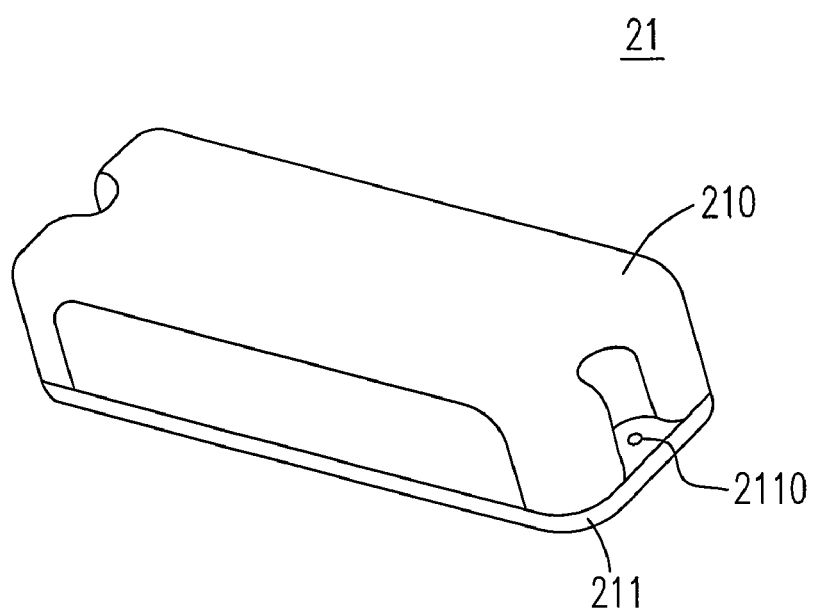
FIG. 2 is a diagram showing a warning device for vehicles according to a second embodiment of the present invention.

Please refer to FIG. 2, which shows a warning device for vehicles according to a second embodiment of the present invention. The second embodiment differs from the first embodiment in that the warning device for vehicles of the second embodiment includes a case 21, which covers the entire device body (not shown) or a portion of the device body. In this embodiment, the case 21 includes a transparent cover 210 and a base 211. In other cases, the case 21 may be designed integrally. The color of light emitted from the warning light may depend on the color of the cover 210. For instance, the warning light emitting red light may be a filament lamp or a bulb with a red cover. The bottom, i.e. the side facing the ground, of the cover 210 is preferably transparent or hollow to aid in emitting auxiliary light toward the bottom of the warning device or the ground. In addition, the cover 210 may be designed to increase the illumination brightness, which may include refractive slots on the inner surface of the cover 210. The warning device may be mounted on vehicles via the connection holes 2110 set on the base 211. However the warning device can be fixed to vehicles using another mounting method.

Figure 3:
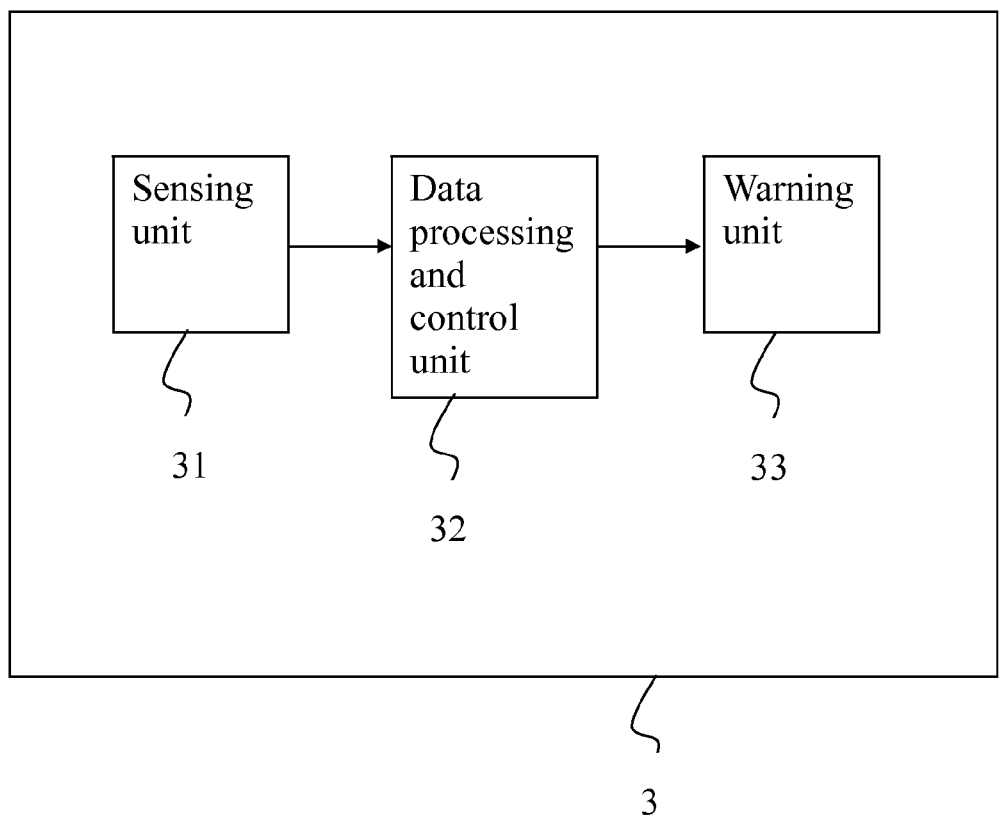
FIG. 3 is a block diagram showing a simplified control system in a warning device for vehicles according to a third embodiment of the present invention.

The present invention may be realized by the third embodiment of the present disclosure. The third embodiment differs from the first embodiment in that it has a control system 3 included in the device body of the warning device of the third embodiment, as shown in FIG. 3. The control system 3 includes a sensing unit 31, a warning unit 33 and a data processing and control unit 32. The sensing unit 31 and the warning unit 33 are separately coupled to the data processing and control unit 32. The sensing unit 31 may detect information including at least one of an image of another vehicle near the user vehicle, a speed or a relative speed of another vehicle, a distance between the user vehicle and another vehicle and a combination thereof, and transmit the detected information to the data processing and control unit 32 for further processing. The data processing and control unit 32 determines if the detected information conforms to a predetermined condition that is a particularly dangerous situation. On the predetermined condition, the warning unit is actuated to provide a warning signal by the data processing and control unit 32. The warning signal may be a warning sound, a continuous lighting of at least one of the warning light, the auxiliary illumination light and the laser module, a twinkle of at lease one of the warning light, the auxiliary illumination light and the laser module or a combination thereof. The warning signal may be activated in synchronous phase with other driving lamps. The predetermined conditions exemplified here include that (1) the distance between the user vehicle and an obstacle such as another vehicle is below a predetermined distance threshold; and (2) the distance between the user vehicle and another vehicle is below a predetermined distance threshold and the speed of the other vehicle is over a predetermined speed threshold. The predetermined distance threshold may be equal to or less than the distance between the laser light and the user vehicle. That is, when an obstacle enters the range outlined by the laser light (e.g. the range between the laser linear light and the user vehicle), the warning signals are generated. The predetermined distance threshold may be slightly greater than the distance between the laser light and the user vehicle. That is, when an obstacle approaches the laser light, the warning signals are generated. The obstacle may be a vehicle, pedestrian, and so on near the user vehicle. When the predetermined conditions are absent, the generation of the warning signals may stops.

In addition, a warning method is provided in the present disclosure. The method includes steps of providing a device body according to various embodiments, emitting a first light toward the lateral side of the device body; and emitting a second light and/or a laser light toward the bottom side of the device body. The first light is a warning light, and the second light is an auxiliary illumination light. The step of emitting a second light and/or a laser light is activated by a user or is controlled by a control system activated by the user. When it is controlled by a control system, the second light and/or the laser light is emitted during dangerous conditions.

Figure 4:
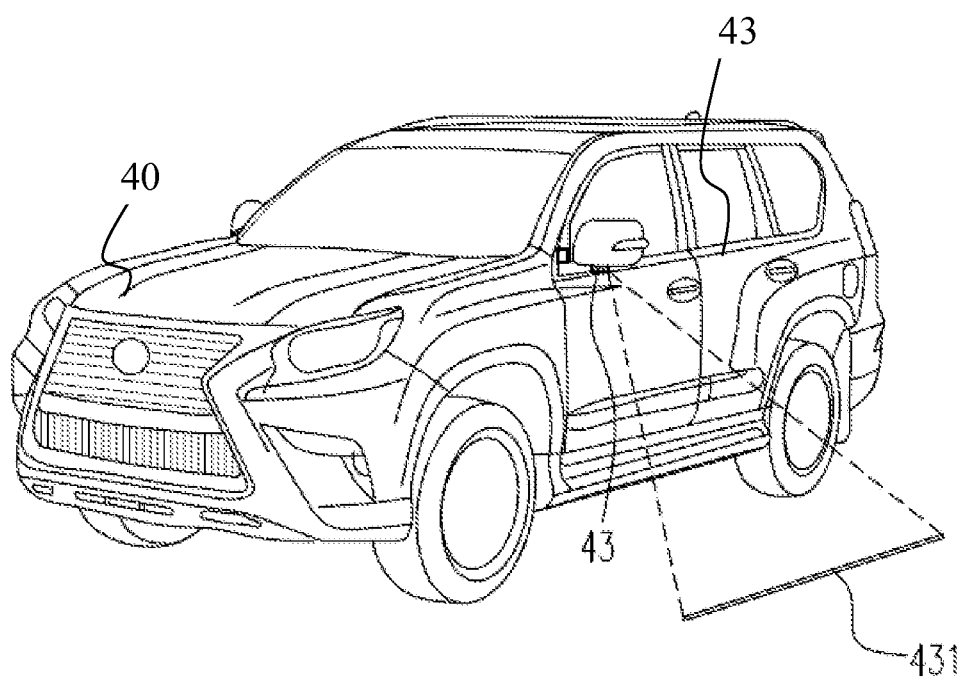
FIG. 4 is a diagram showing use of a warning device for vehicles according to a fourth embodiment of the present invention.

Please refer to FIG. 4, which shows the use of a warning device for vehicles according to a fourth embodiment of the present invention. The warning device based on the fourth embodiment is mounted on a car 40 and includes a laser module 43. The laser module 43 emits a laser light 431 toward the bottom side of the laser module 43. In this embodiment, the laser light 431 is a laser linear light, but it is not limited thereto. Specifically, the laser module 43 emits the laser light 431 toward the pavement and outline the occupied range of the car 40 or the safety distance so as to warn other drivers or pedestrians against approaching or entering the region outlined by the laser light 431. The laser module 43 and the laser light 431 may have the function similar to that of the laser module 13 and the laser light in the first embodiment. As long as the laser light can have the above function, the warning device based on the fourth embodiment can be configured anywhere on the car, such as at the bottom of the left rearview mirror or the right rearview mirror, as shown in FIG. 4.

Figure 5:
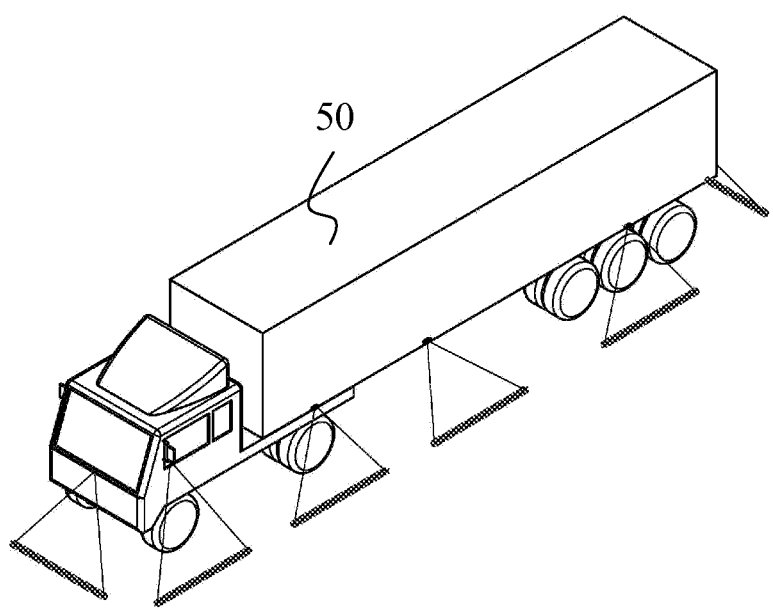
FIG. 5 is a diagram showing configurations of warning devices for vehicles according to various embodiments of the present invention.

Please refer to FIG. 5, which shows the configurations of warning devices for vehicles according to various embodiments of the present invention. As shown in FIG. 5, the position of the warning device on a vehicle such as a truck 50 is not limited as long as it can function well in accordance with the descriptions for various embodiments. For example, one or more warning devices can be configured on both sides, the rear or the front of the truck 50. Particularly, the warning device can be integrated to the existing components on the truck, such as the left or right rearview mirror or the side lights. When the warning device is configured on either side of the truck 50, it can be configured on the left or right rearview mirror, the suitable positions of the container or above the wheels. The number and the configured position of the warning device may depend on the user preference or the actual requirement.

The warning device in the present disclosure can be applied to various vehicles, particularly large vehicles, such as trailers, trucks, container cars, buses, engineering vehicles, and so on, and large moveable machines such as construction machines and agricultural machines. The present invention combines the warning light and the emergency illumination light and/or laser module and is a multi-purpose warning device, which can significantly enhance traffic safety. The laser light provided by the laser module in the present disclosure can serve as not only the warning signal for the user and the vehicles nearby, but can also be a reference signal for the pavement condition and the intended turn or lane change of the user vehicle. In addition, the control system in the present disclosure further enhances traffic safety by providing warning signals during predetermined dangerous conditions to draw the attention of the relevant people or cars, and would thus reduce traffic collisions. The warning device according to the present disclosure may be disabled during the daytime and enabled on said predetermined dangerous conditions. During night driving, the warning light, auxiliary illumination light and the laser module can be activated selectively and independently and respond to the predetermined dangerous conditions.

Some embodiments of the present disclosure are described in the following.

1. A warning device for a vehicle comprises a main body including a lateral side and a bottom side; a warning light device configured on the main body and emitting a warning light toward the lateral side; and at least one of an auxiliary illumination light device and a laser module configured on the main body and emitting an auxiliary light toward the bottom side.

2. A warning device of any of the embodiment 1, wherein when the warning device comprises the auxiliary illumination light device, the auxiliary light is an auxiliary illumination light, when the warning device comprises the laser module, the auxiliary light is a laser light, and when the warning device comprises both the auxiliary illumination light device and the laser module, the auxiliary light includes at least one of the auxiliary illumination light and the laser light.

3. A warning device for a first vehicle comprises a main body including a lateral side and a bottom side; a first light device configured on the main body and emitting a first light toward the lateral side; and at least one of a second light device and a laser module configured on the main body and emitting a second light toward the bottom side.

4. A warning device of any of the previous embodiments, wherein the first light is a warning light, when the warning device comprises the second light device, the second light is an auxiliary illumination light, when the warning device comprises the laser module, the second light is a laser light, and when the warning device comprises both the second light device and the laser module, the second light includes at least one of the auxiliary illumination light and the laser light.

5. A warning device of any of the previous embodiments, wherein when the warning device comprises the laser module, the second light is a laser light emitted onto a ground and outlining a safe distance between the first vehicle and a second vehicle.

6. A warning device of any of the previous embodiments further comprises a control system configured on the main body.

7. A warning device of any of the previous embodiments, wherein the control system includes a sensing unit detecting an information being one selected from the group consisting of an image of a second vehicle, a distance between the first vehicle and the second vehicle, a speed of the second vehicle and a combination thereof.

8. A warning device of any of the previous embodiments, wherein the control system further includes a warning unit coupled to the sensing unit and providing a warning signal under a predetermined condition.

9. A warning device of any of the previous embodiments, wherein the control system further includes a data processing and controlling unit coupled to the sensing unit and the warning unit and determining whether the detected information conforms to the predetermined condition.

10. A warning device of any of the previous embodiments, wherein the warning signal is one selected from a group consisting of a warning sound, a continuous lighting of the first light, a twinkle of the first light, a continuous lighting of the second light, a twinkle of the second light and a combination thereof.

11. A warning device of any of the previous embodiments, wherein the predetermined condition is at least one that the distance between the first vehicle and the second vehicle is less than a predetermined distance and the speed of the second vehicle is higher than a predetermined speed.

12. A warning device of any of the previous embodiments, wherein the second light is a laser light emitted onto a ground and the predetermined distance is equal to a distance between the first vehicle and the laser light.

13. A warning device of any of the previous embodiments, wherein the second light is a laser light emitted onto a ground and the predetermined distance is less than a distance between the first vehicle and the laser light on the ground.

14. A warning device of any of the previous embodiments further comprises a case containing the main body.

15. A warning device of any of the previous embodiments, wherein the case includes a transparent bottom and the second light passes through the transparent bottom.

16. A warning device of any of the previous embodiments, wherein the case includes a hollow bottom and the second light passes through the hollow bottom.

17. A warning device of any of the previous embodiments, wherein the case includes an inner surface and plural refractive slots configured on the inner surface.

18. A warning method for a first vehicle comprises providing a main body including a lateral side and a bottom side; emitting a first light from the main body toward the lateral side; and emitting a second light from the main body toward the bottom side.

19. A warning method of embodiment 18, wherein the second light is emitted onto a ground and outlines a safe distance between the first vehicle and a second vehicle.

20. A warning method of any of the previous embodiments, wherein the second light is emitted onto a ground to explore a condition of the ground.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A warning device for a vehicle, comprising:
a main body including a lateral side and a bottom side;
a warning light device configured on the main body and emitting a warning light toward the lateral side; and
at least one of an auxiliary illumination light device and a laser module configured on the main body and emitting an auxiliary light toward the bottom side, wherein when the warning device comprises the auxiliary illumination light device, the auxiliary light is an auxiliary illumination light; when the warning device comprises the laser module, the auxiliary light is a laser light; and when the warning device comprises both the auxiliary illumination light device and the laser module, the auxiliary light includes at least one of the auxiliary illumination light and the laser light.

2. A warning device for a first vehicle, comprising:
a main body including a lateral side and a bottom side;
a first light device configured on the main body and emitting a first light toward the lateral side; and
at least one of a second light device and a laser module configured on the main body and emitting a second light toward the bottom side, wherein the first light is a warning light, when the warning device comprises the second light device, the second light is an auxiliary illumination light; when the warning device comprises the laser module, the second light is a laser light; and when the warning device comprises both the second light device and the laser module, the second light includes at least one of the auxiliary illumination light and the laser light.

3. A warning device of claim 2, wherein when the warning device comprises the laser module, the second light is a laser light emitted onto a ground and outlining a safe distance between the first vehicle and a second vehicle.

4. A warning device of claim 2, further comprising a control system configured on the main body.

5. A warning device of claim 4, wherein the control system includes a sensing unit detecting an information being one selected from the group consisting of an image of a second vehicle, a distance between the first vehicle and the second vehicle, a speed of the second vehicle and a combination thereof.

6. A warning device of claim 5, wherein the control system further includes a warning unit coupled to the sensing unit and providing a warning signal under a predetermined condition.

7. A warning device of claim 6, wherein the control system further includes a data processing and controlling unit coupled to the sensing unit and the warning unit and determining whether the detected information conforms to the predetermined condition.

8. A warning device of claim 6, wherein the warning signal is one selected from a group consisting of a warning sound, a continuous lighting of the first light, a twinkle of the first light, a continuous lighting of the second light, a twinkle of the second light and a combination thereof.

9. A warning device of claim 6, wherein the predetermined condition is at least one that the distance between the first vehicle and the second vehicle is less than a predetermined distance and the speed of the second vehicle is higher than a predetermined speed.

10. A warning device of claim 9, wherein the second light is a laser light emitted onto a ground and the predetermined distance is equal to a distance between the first vehicle and the laser light.

11. A warning device of claim 9, wherein the second light is a laser light emitted onto a ground and the predetermined distance is less than a distance between the first vehicle and the laser light on the ground.

12. A warning device of claim 2, further comprising a case containing the main body.

13. A warning device of claim 12, wherein the case includes a transparent bottom and the second light passes through the transparent bottom.

14. A warning device of claim 12, wherein the case includes a hollow bottom and the second light passes through the hollow bottom.

15. A warning device of claim 12, wherein the case includes an inner surface and plural refractive slots configured on the inner surface.

* * * * *